United States Patent [19]
Bray, Sr.

[11] 3,889,581
[45] June 17, 1975

[54] DUCTED GREASE VAPOR EXHAUST SYSTEM

[76] Inventor: William W. Bray, Sr., 1423 Bethlehem Pk., Ambler, Pa. 19002

[22] Filed: Feb. 25, 1974

[21] Appl. No.: 445,094

[52] U.S. Cl. ............ 98/115 K; 55/228; 55/DIG. 36
[51] Int. Cl. .......................................... B01d 47/06
[58] Field of Search ....... 98/115 K, 115 R, 115 VM, 98/115 LH; 126/299 B, 299 A, 299 R, 300, 98; 55/DIG. 36, 267; 138/149

[56] References Cited
UNITED STATES PATENTS

| | | | |
|---|---|---|---|
| 1,045,459 | 11/1912 | Todd et al. | 138/149 |
| 1,109,017 | 9/1914 | Riley | 126/299 B |
| 2,350,735 | 6/1944 | Egge | 98/115 K |
| 2,489,048 | 11/1949 | Rinehart | 138/149 |
| 3,092,529 | 6/1963 | Pearson | 138/149 |
| 3,432,381 | 3/1969 | Collins, Jr. | 162/152 |
| 3,730,073 | 5/1973 | Potter | 138/149 |
| 3,731,462 | 5/1973 | Costarella et al. | 98/115 K |
| 3,785,124 | 1/1974 | Gaylord | 98/115 K |

*Primary Examiner*—John J. Camby
*Assistant Examiner*—Henry C. Yuen
*Attorney, Agent, or Firm*—Paul Lipsitz

[57] ABSTRACT

A duct system for conducting grease-containing vapors from a cooking stove which comprises in combination, a hood and a duct attached to said hood to permit entry of vapors, said duct being terminated by a fan to draw said vapors through said duct system, said duct consisting of a double-walled conduit having thermal insulation between the walls, said inner conduit being impervious to vapor leakage, and said duct consisting of fixed sections abutting removable sections to provide access to the interior of the duct, the butted ends being fitted with a thermally insulating and grease-vapor impervious gasket to provide a fully insulated and leak proof system.

5 Claims, 7 Drawing Figures 3,889,581

PATENTED JUN 17 1975
SHEET 1

DUCTED GREASE VAPOR EXHAUST SYSTEM

This invention relates to an improvement in the art of venting grease-laden vapors from an inside cooking area to the outside.

In restaurant and other kitchens where large quantities of food are prepared several serious problems and hazards exist due to the accumulation of grease within conventional sheet metal venting systems. In spite of grease filters placed on stove hoods the accumulations of grease within the ducted venting systems is so great that frequent periodic cleaning of the grease within the ducts is necessary to reduce the hazard of fire. Nevertheless, the likelihood of fire is quite high and any fire that might start on the cooking stove quickly spreads to within the ductwork. Because of the intense heat in the ductwork the surrounding wood or other combustible construction material begins to burn and the fire quickly spreads further. Still another cause of fire spreading and fire initiation is the build-up of grease outside the duct in, on, and around combustible materials due to leakage of grease vapors through the duct seams, joints, and other areas in the duct system through which grease vapors penetrate.

Still another problem associated with the above described duct systems is the difficulty in carrying out the required periodic cleaning of the ducts. The present practice is to cut access holes in several locations of the sheet metal ducts which run, generally, in concealed spaces. Then it is necessary to insert scrapers in the ducts and scrape out the grease accumulation. This is not only physically difficult because of the limited space available in which to work, but creates a further hazard. This hazard results from the poor fitting of the cover plates for the access holes and thereby provides another point at which grease vapors get outside the duct system.

It is an object of this invention to provide a duct system with ready access for cleaning.

Another object of the invention is to provide a ducted system which will prevent leakage of grease vapors from the system.

Still another object of the invention is to provide a duct system which will contain any fire that gets into the system and thus prevent the spread of fire to surrounding areas.

A still further object of the invention is to provide a duct system with means to extinguish fires within it.

In accord with the invention there is provided a duct system for conducting grease-containing vapors from a cooking stove which comprises in combination a hood and a duct system attached to said hood to permit entry of vapors, said duct being terminated by a fan to suck vapors through said duct system, said duct consisting of a double-walled conduit having thermal insulation between the walls, said inner conduit being impervious to vapor leakage, and said duct consisting of fixed sections abutting removable sections to provide access to the interior of said duct, the butted ends being fitted with a thermally insulating and grease-vapor impervious gasket to provide a fully insulated and leak-proof system.

Another embodiment of the invention provides means to extinguish fires that may occur in the above described duct system.

Reference is now made to the drawings.

Figure 6:
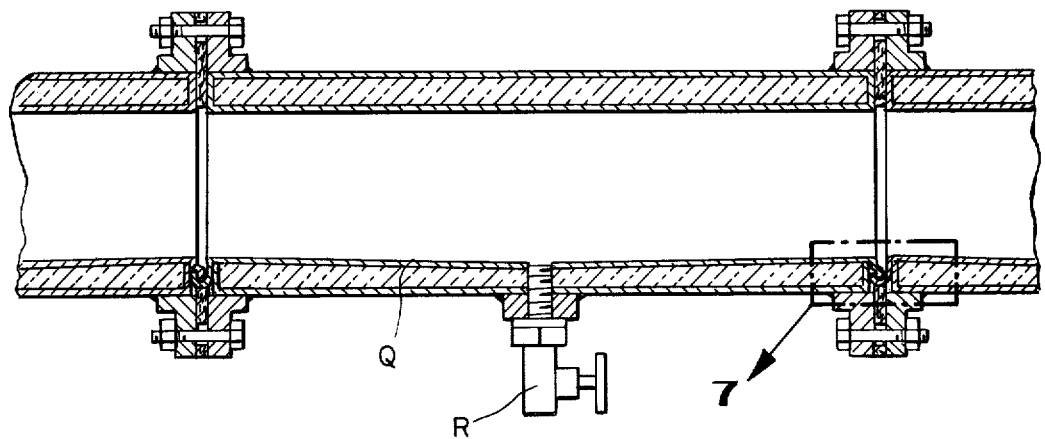
FIG. 6 illustrates an embodiment of the invention where a grease drain is employed in the system and an alternate connecting means for adjacent ducts.
Figure 7:
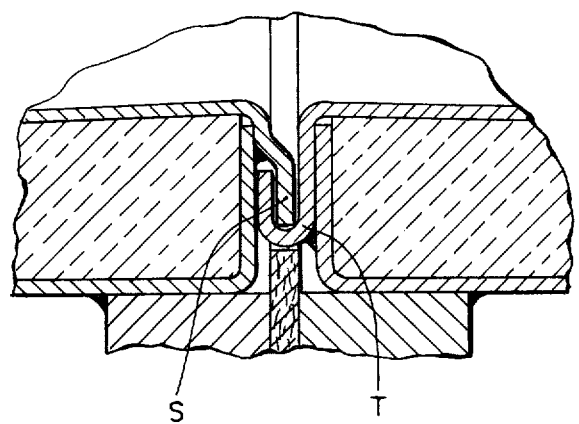

FIG. 7 gives enlarged detail of the area 7 of FIG. 6.

Figure 1:
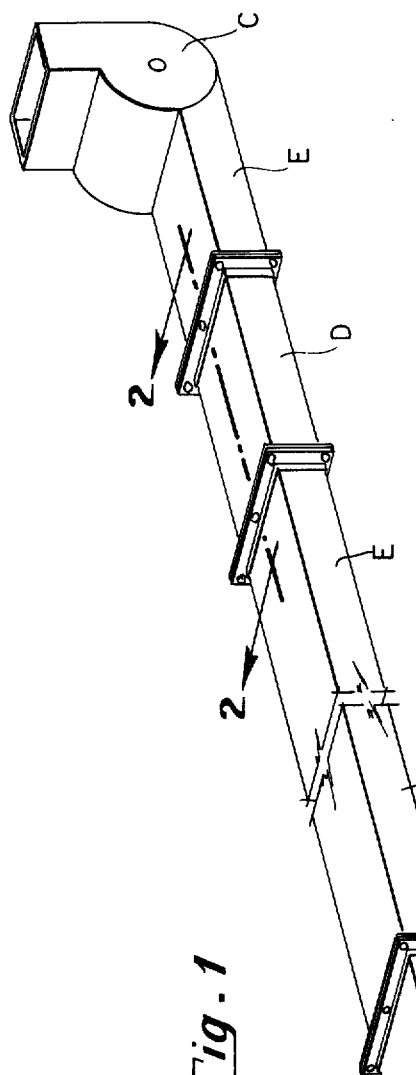
FIG. 1 is a view in perspective of a cooking stove, hood and vent system of the invention.

Referring now to FIG. 1, it will be understood that the grease containing cooking vapors generated on stove A are sucked up into hood B by means of the vent system incorporating fan C which causes the vapors to exit generally through the roof to the outside. As shown in FIG. 1, the vent system will have one or more removable conduit sections D abutting non-removable sections E which will be fixed by mounting within the passageway.

Figure 2:
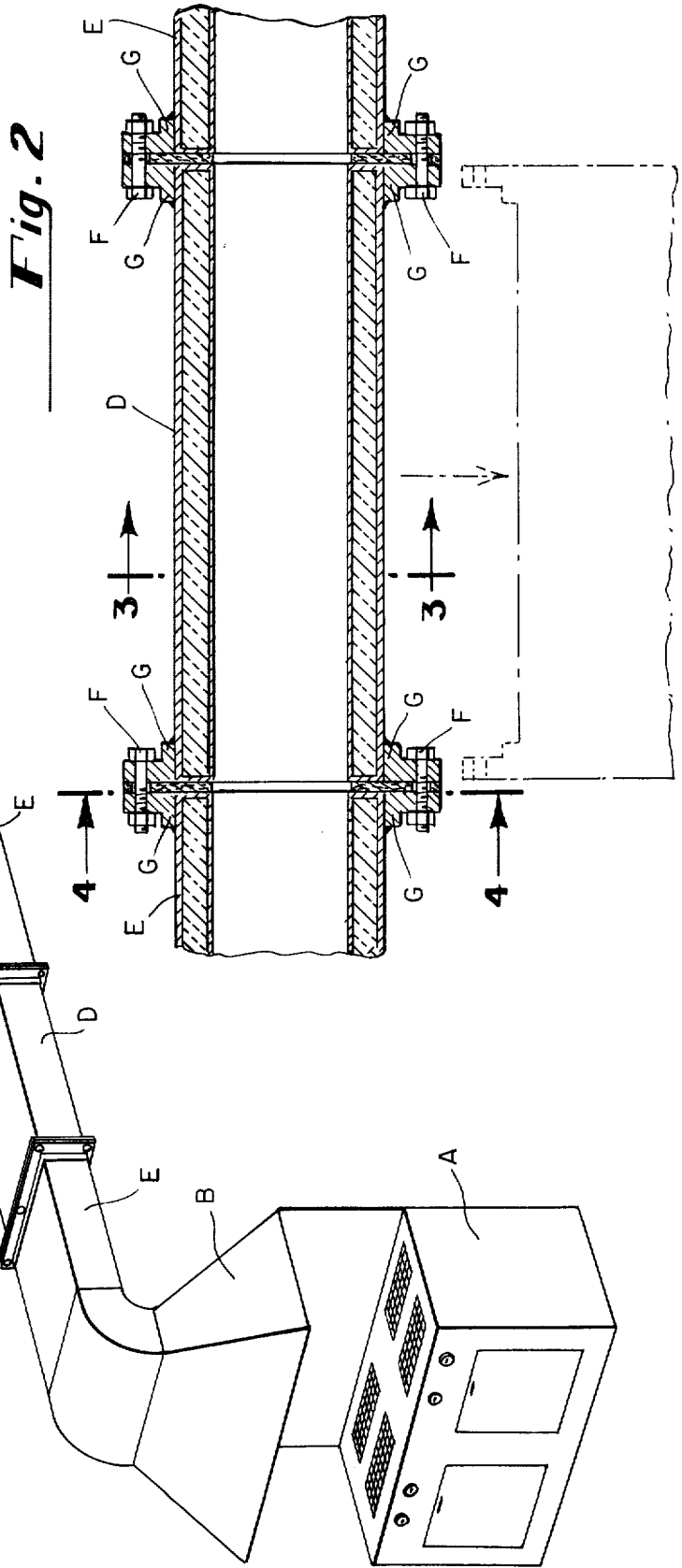
FIG. 2 is a detailed drawing of the double walled conduit showing fixed sections and an abutted removable section.

FIG. 2 shows in detail a removable section of the vent system. As shown, to remove the section, fastening means (here illustrated by bolts F bringing together and holding rigid butted flanges G) are removed and the removable section slipped out as shown. Flanges G will be fixed to the outer shell of the conduit sections D and E by welds or other means. Replacement after cleaning the interior of the duct (i.e., the fixed and removable ducts, D and E) is accomplished simply by the reverse procedure of placing the replaceable section between the fixed sections and fastening the bolts on the flanges to give a tight seal.

Figure 3:
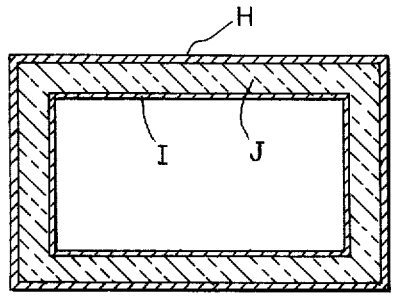
FIG. 3 shows a view of the double walled conduit along line $a-a$ of FIG. 2.

FIG. 3 shows in more detail the construction of the double walled duct. Outside wall H is separated from inner wall I by insulation J. Both the inner and outer walls will be constructed of metal, preferably steel, galvanized metal or the like, and in accord with the invention the inner duct will be impervious to vapor leakage. This may be accomplished, for example, by use of welded seams or seams otherwise sealed to prevent loss of vapor from inside to outside of the duct. It will be understood that circular, oval or cross-sections other than the preferred rectangular section shown may be used.

The insulation used in the system must be capable of withstanding the high temperatures generated by fire and will preferably be materials such as "Panelag," "Insulag," and "Sil-O-Cell" which are tradenames for commercially available insulating lagging materials. "Panelag" (sold by Quigley Co., New York, N.Y.) is effective as an insulator up to about 1,700° Fahrenheit, while "Insulag" (also sold by Quigley Co.) which is a refractory plastic material and "Sil-O-Cell" (Johns-Manville Co.) which is a coarse, granular calcined diatomaceous silica are suitable up to 2,000° Fahrenheit. These materials are mixed with water to form a plastic cement which hardens after being put in place to form the insulation material. Also useful and preferred as an insulator are alumina polycrystalline fibers known as "Saphibers" which is available from Aluminum Company of America and which readily withstands temperatures above 3,300° Fahrenheit. (See U.S. Pat. No. 3,705,223.) Also preferred useful materials are the alumina fibers made by Carborundum, formulated and sold as "Fiberfrax" H and 970J paper (see *Chemical Week*, Feb. 14, 1973, page 65). Other alumina based fibers in blanket or strip form are also useful. These materials are easily handled and in a preferred technique they need only be wrapped around the outside wall of the inner duct before the outer duct is placed over it. The insulation serves to firmly retain the inner duct within the outer duct and therefore no internal mounting brackets for the inner duct are required. This is a distinct advantage because, in the event of a fire, in the inner duct, no heat conducting surfaces are present which would defeat the purpose of the insulation and carry heat out of the ductwork system.

Figure 4:
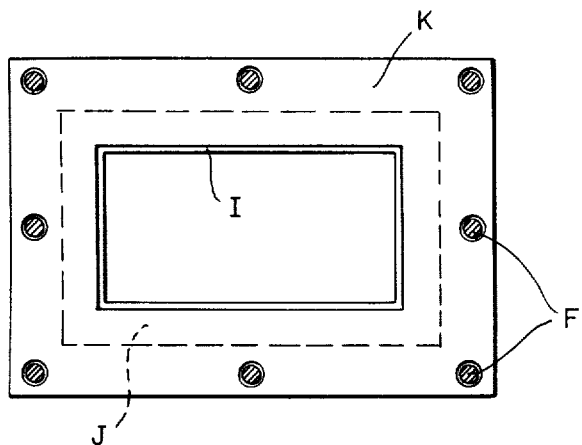
FIG. 4 is a detailed view of one end of a removable section.

FIG. 4 shows the detail of an end of a removable section, fitted with a gasket K to separate abutting ducts, which gasket has openings for bolts F and is thermally insulating and impervious to grease and grease vapors. The gasket may be made from materials such as asbestos which is preferably impregnated with a sealing compound, or a thin section of the above described insulators may be formed into a gasket. The gasket is preferably fixed to a flange with an insulating cement such as a mixture of asbestos fiber (50 percent) and portland cement (50 percent) and applied by mixing with just enough water to make it plastic.

Figure 5:
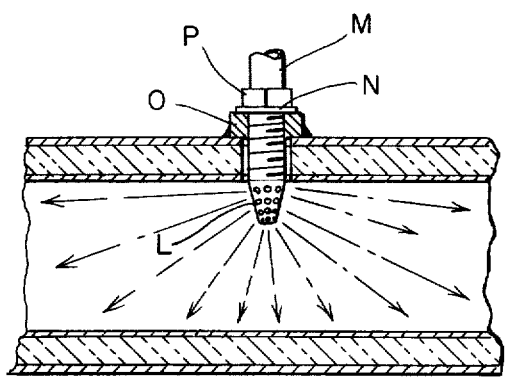
FIG. 5 illustrates the use of fire extinguishing means within the conduit.

FIG. 5 illustrates the use of fire extinguishing means within the conduit system. The spray nozzle L lies within a fixed, non-removable section of the duct system and will spray a fire extinguishing material such as water, carbon dioxide, fluorocarbons, sodium bicarbonate powder, and like materials through a feed pipe M when actuated by either a manually or electronically controlled thermal trigger system (not shown). The attachment means of the feed pipe M and nozzle L will include a grease and vapor impervious, thermally resistant gasket N which may be made of the materials discussed above and which separates mounting means O and a lock nut P.

In a preferred system, one or more non-removable ducts near the hood above the cooking stove will be fitted with the fire extinguishing means and will have a temperature sensing device (e.g., a thermocouple) incorporated with or adjacent to the spray nozzle. The sensor, in turn, will be connected electrically to a valve which, when triggered by the sensor, will open the flow of fire extinguishing agent to the nozzle. Thus, as soon as fire enters within the duct system it will be detected thermally by the sensor and thus trigger an effective fire extinguishing means within the duct.

Still another embodiment of the invention is shown in FIGS. 6 and 7. In FIG. 6, the bottom of the inner duct Q is shown to slope toward the center which is fitted with a valve R. The sloping bottom and valve in combination effect a collection point for liquid grease which collects within the duct work. The use of polyunsaturated fats for cooking results in liquid grease buildup as well as solid grease formation within the duct work and the collection area and valve as shown permits periodic collection and thus serves to increase the interval between cleanings and to make such cleaning operations less difficult since it enables easy removal of the liquid grease which otherwise spills from the duct when it is opened.

FIG. 7 shows the detail of area within the dashed lines 7 which relates to an alternate means of butting the sections of the ducts. As shown in FIG. 7, a lip S protruding from one end of the inner wall of one duct section rests within an engaging channel T on the abutting end of a second duct section. The lip and channel effectively serve to make removal and replacement of the removable sections less cumbersome and enables one person to accomplish such removal and replacement. Furthermore, the channel T serves to catch and hold any liquid grease thereby preventing any possible penetration to the insulation and through the butted joint. The same type of construction may be used for the upper portion of the duct work.

I claim:

1. A duct system for conducting grease-containing vapors from a cooking stove which comprises in combination, a hood and an essentially horizontal duct attached to said hood to permit entry of vapors, said duct being terminated by a fan to draw said vapors through said duct system, said duct consisting of sections of a double walled conduit having thermal insulation between the walls, said inner conduit being impervious to vapor leakage, and said duct consisting of removable sections interspersed between fixed non-removable sections, said removable sections abutting said non-removable sections to thereby provide access to the interior of the duct, the butted ends being fitted with a thermally insulating and grease-vapor impervious gasket to provide a fully insulated and leak-proof system.

2. The duct system of claim 1 wherein the thermal insulation is an alumina fiber.

3. The duct system of claim 1 wherein fixed sections are fitted with fire extinguishing means.

4. The duct system of claim 1 wherein the bottom of the duct is sloped toward the center and fitted at said center with a valve to collect accumulation of liquid grease.

5. The duct system of claim 1 wherein the inner conduit is equipped with an engaging lip and channel.

* * * * *